US007637003B2

(12) United States Patent
Imgrüt et al.

(10) Patent No.: US 7,637,003 B2
(45) Date of Patent: Dec. 29, 2009

(54) CRIMPING PRESS

(75) Inventors: Peter Imgrüt, Baar (CH); Enrico Gasparini, Zürich (CH); Marc Speck, Zug (CH)

(73) Assignee: Komax Holding AG, Dierikon (CH)

( * ) Notice: Subject to any disclaimer, the term of this patent is extended or adjusted under 35 U.S.C. 154(b) by 101 days.

(21) Appl. No.: 11/532,948

(22) Filed: Sep. 19, 2006

(65) Prior Publication Data

US 2007/0062034 A1 Mar. 22, 2007

(30) Foreign Application Priority Data

Sep. 19, 2005 (EP) ................................ 05108630

(51) Int. Cl.
*B23P 19/00* (2006.01)

(52) U.S. Cl. ............................ 29/739; 29/740; 29/741

(58) Field of Classification Search .................. 29/748, 29/749, 753, 739, 740, 741
See application file for complete search history.

(56) References Cited

U.S. PATENT DOCUMENTS

| | | | | | |
|---|---|---|---|---|---|
| 3,184,950 | A | * | 5/1965 | Sitz | 72/331 |
| 3,813,753 | A | * | 6/1974 | Miller | 29/566.2 |
| 4,707,913 | A | * | 11/1987 | Moline | 29/753 |
| 5,095,599 | A | * | 3/1992 | Gloe et al. | 29/33 M |
| 5,275,032 | A | * | 1/1994 | Gloe et al. | 72/19.8 |
| 5,337,589 | A | | 8/1994 | Gloe et al. | |
| 5,893,289 | A | | 4/1999 | Yeomans et al. | |
| 6,067,828 | A | | 5/2000 | Bucher et al. | |
| 6,301,777 | B1 | * | 10/2001 | Sigler et al. | 29/753 |
| 6,418,755 | B2 | * | 7/2002 | Chenoweth | 65/134.6 |
| 6,418,765 | B1 | * | 7/2002 | Chiu | 70/279.1 |
| 6,487,885 | B2 | * | 12/2002 | Meisser et al. | 72/20.1 |
| 2003/0163916 | A1 | | 9/2003 | Conte | |

FOREIGN PATENT DOCUMENTS

| | | |
|---|---|---|
| EP | 0 889 561 B1 | 1/1999 |

* cited by examiner

*Primary Examiner*—C. J Arbes
(74) *Attorney, Agent, or Firm*—Fraser Clemens Martin & Miller LLC; William J. Clemens

(57) ABSTRACT

In this crimping device, a press slide (5) is provided with a crimp-height adjuster (20) for the insulation crimper (9). The crimp-height adjuster (20) arranged on the press slide (5) above an upper tool (7) consists essentially of a rotationally hindered eccentric disk (21), a lever (22), and a magnet (23) with plunger (24). The eccentric disk (21) is mounted rotatably on an axle (25). During production of crimp connections, the plunger (24) is at rest outside an elongated hole (28) of the lever (22). The press slide (5) with the upper tool (7) can be moved up and down without hindrance. With the plunger (24) inserted into the elongated hole (28) and with an upward motion of the press slide (5), after overcoming the friction of a disk-spring assembly the eccentric disk (21) executes rotational motion in clockwise direction. The lever (22) that is rigidly connected to the axle (25) turns the eccentric disk (21) about the axle (25). The eccentric disk (21) defines the crimp height for the insulation crimper (9).

12 Claims, 5 Drawing Sheets

CRIMPING PRESS

BACKGROUND OF THE INVENTION

The present invention relates to a crimping press and a method of fastening a crimped contact to a wire, the wire conductor and wire insulation being fasteneable to the crimped contact by means of crimpers arranged on a press slide, and the press slide being drivable by means of a press motor, and a crimp-height adjuster for adjusting the crimp height of at least one crimper being provided.

There is shown in European patent specification EP 0 889 561 B1 a crimping device in which a drive for adjusting the crimp height of the conductor crimper and a drive for adjusting the height of the insulation crimper are provided. On each drive, a motor drives a splined shaft that drives a worm gear that drives an eccentric shaft that adjusts the height of a pressing part of the crimper. The worm gear and eccentric shaft are integrated in the press slide.

Disadvantageous of this device are the complicated and expensive mechanical construction.

SUMMARY OF THE INVENTION

The crimping press according to the present invention provides a remedy. The present invention provides a solution for avoiding the disadvantages of the known device, and creating a device and a method that enable simple adjustment of the crimp height.

The advantages achieved by means of the present invention include that adjustment of the crimp height is possible by simple means. On the press slide, only an eccentric disk or cam disk is required that serves as stop for the vertical motion of the crimper. Rotation is imparted to the eccentric disk by means of the press motor which is sufficiently powerful to turn the rotationally hindered eccentric disk. With the rotational hindrance, the eccentric disk cannot become displaced during production (upward/downward movement of the press slide for producing the crimped fastenings). With the crimp-height adjuster according to the present invention, the crimper can be easily adapted to different diameters of wire conductor or to different diameters of wire insulation.

In the device according to the present invention, the crimp-height adjuster can be actuated by means of the press motor.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
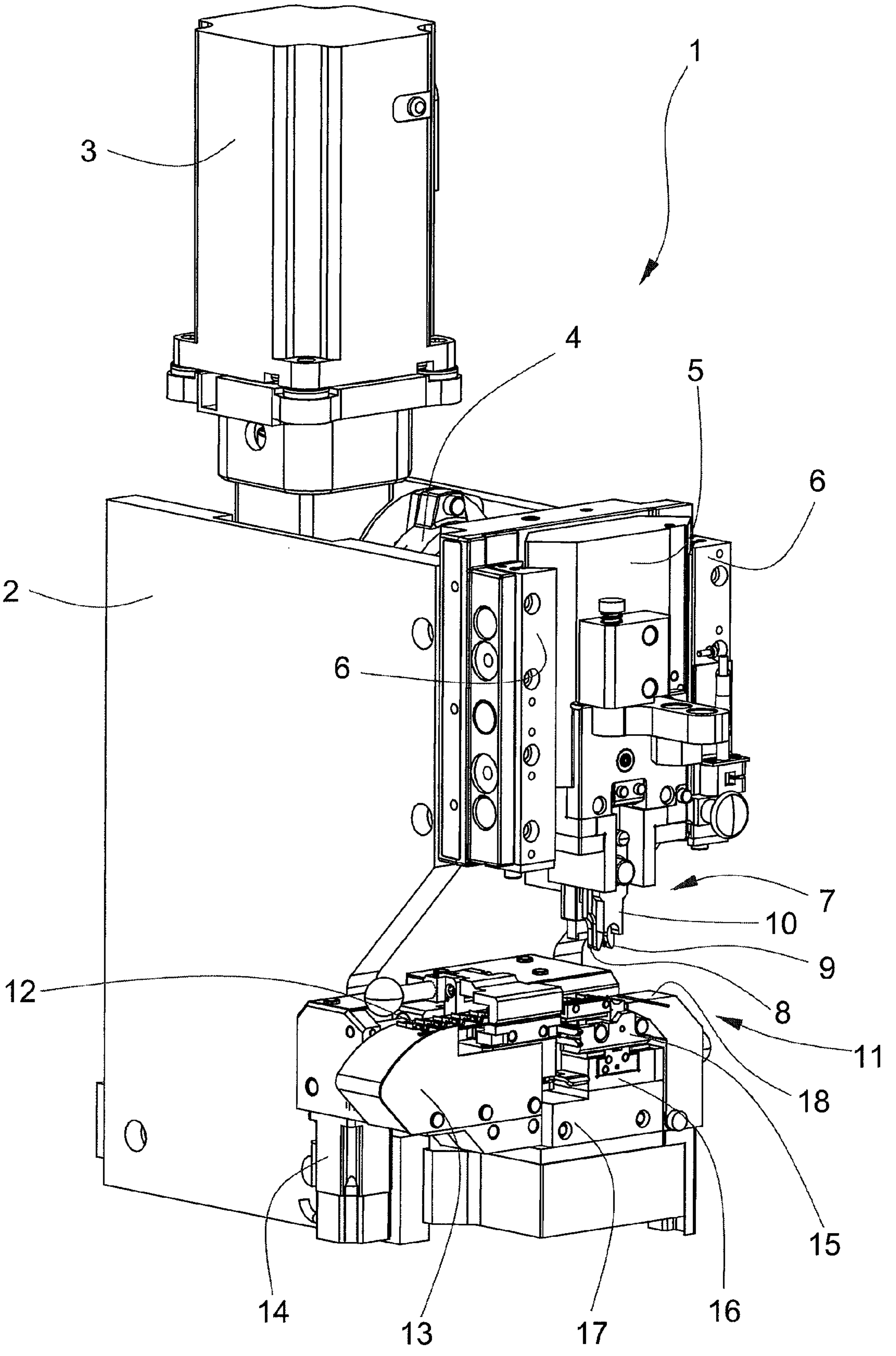
FIG. 1 is a perspective view of a crimping press according to the present invention.

FIG. 1 shows a crimping press 1 according to the present invention comprising a first housing 2 on which a press motor 3 that drives a gear 4 is arranged. Provided on the output side of the gear is an eccentric device that converts the rotational motion of the motor 3 and the gear 4 into a linear up-and-down motion that can be transferred to a press slide 5, the press slide 5 being guided by means of guides 6. Provided for the production of a crimped fastening between a crimped contact 37 (FIG. 6) and a wire 18 that has been stripped of insulation and arranged on the press slide 5 is an upper tool 7 with a conductor crimper 8, an insulation crimper 9, and a cutter plunger 10, the upper tool 7 working in conjunction with a lower tool 11. The lower tool 11 comprises an anvil part 15 with anvil, a sensor part 16, and a first supporting part 17. The crimped contacts 37 to be processed are parts of a contact belt 12 that is advanced by means of a contact advancer 13. An advancing motor 14 drives the contact advancer 13.

Figure 2:
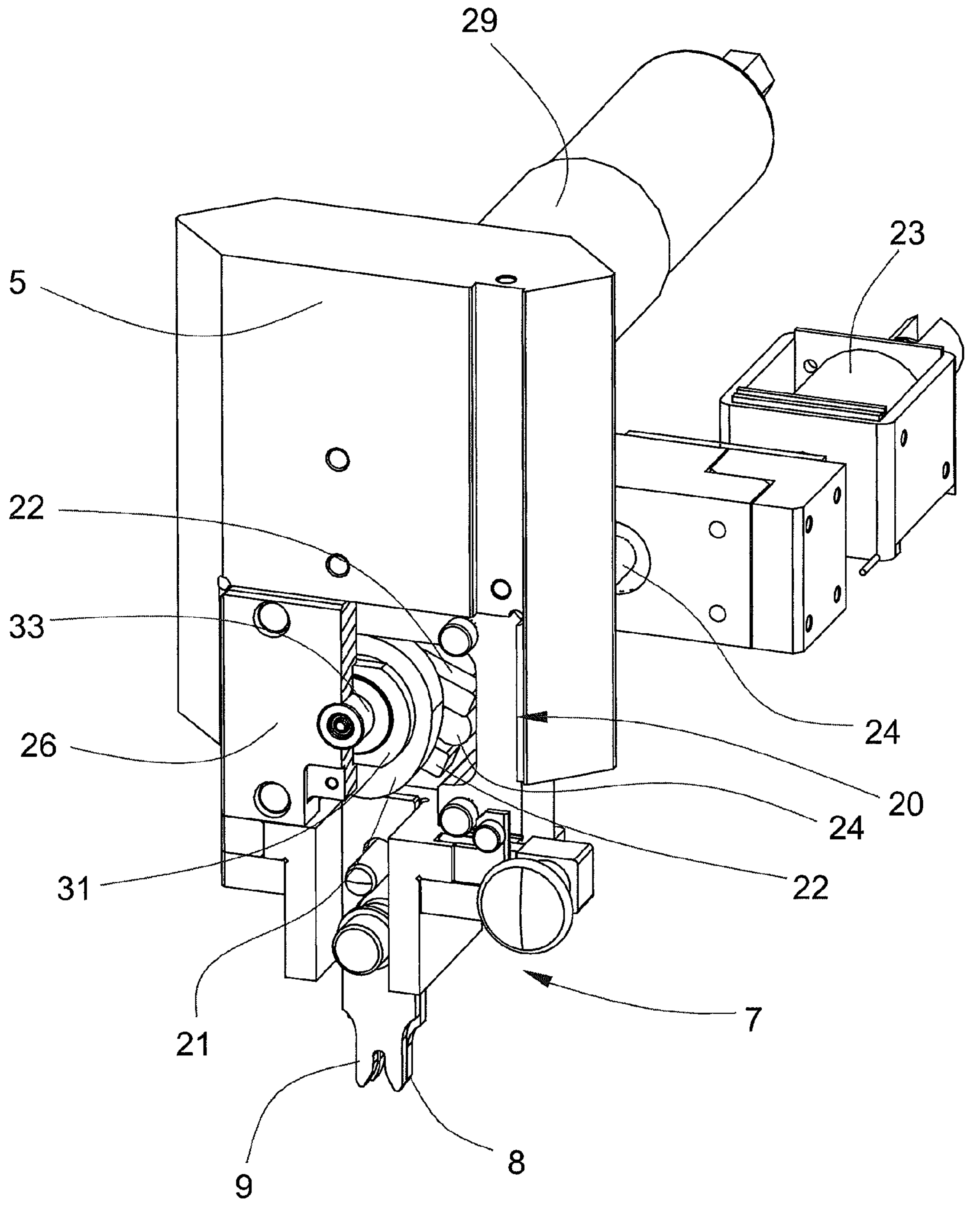
FIGS. 2 and 3 are enlarged perspective views of the press slide with the crimp-height adjuster shown in FIG. 1.
Figure 3:
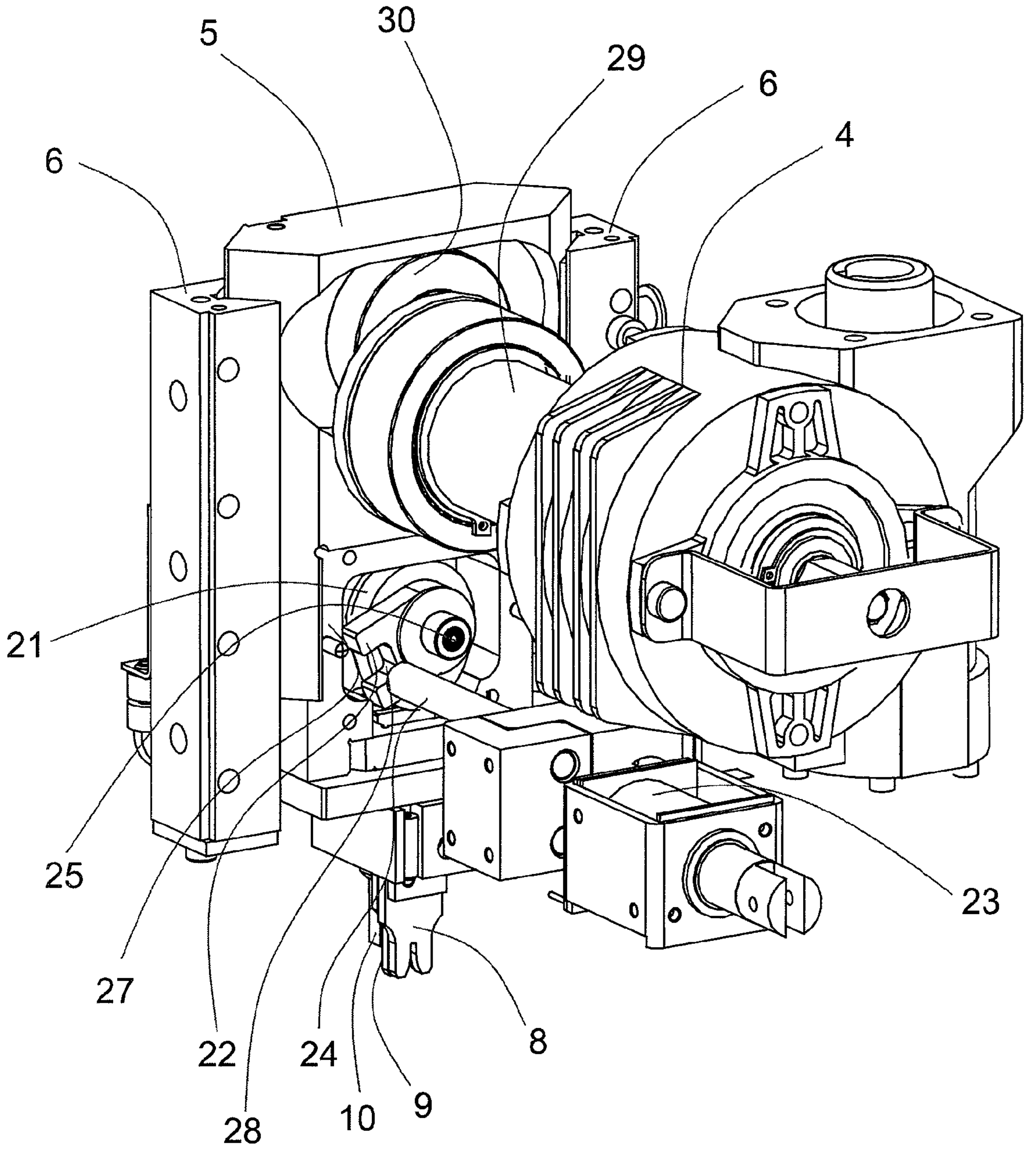

FIG. 2 shows the press slide 5 as seen from the wire side with a crimp-height adjuster 20 for the insulation crimper 9. FIG. 3 shows the press slide 5 as seen from the contact side with the crimp-height adjuster 20 for the insulation crimper 9. The crimp-height adjuster 20 arranged on the press slide 5 above the upper tool 7 consists essentially of a rotationally hindered eccentric disk 21, a lever 22, and a magnet 23 with a plunger 24. The eccentric disk 21 is mounted rotatably on an axle 25 that is supported on a front wall 26 and on a back wall 27 of the press slide 5. The front wall 26 and the back wall 27 are shown cut open.

During production (upward/downward motion of the press slide 5 for the production of crimped fastenings) the plunger 24 is in the at-rest position, i.e. one end of the plunger 24 is at rest outside an elongated hole 28 of the lever 22. The press slide 5 with the upper tool 7 can be moved up and down without hindrance by means of an eccentric shaft 29 with a roller 30. The eccentric shaft 29 and the roller 30 are driven by means of the gear 4 and the press motor 3. The eccentric shaft 29 with the roller 30 form the aforesaid eccentric device.

Figure 4:
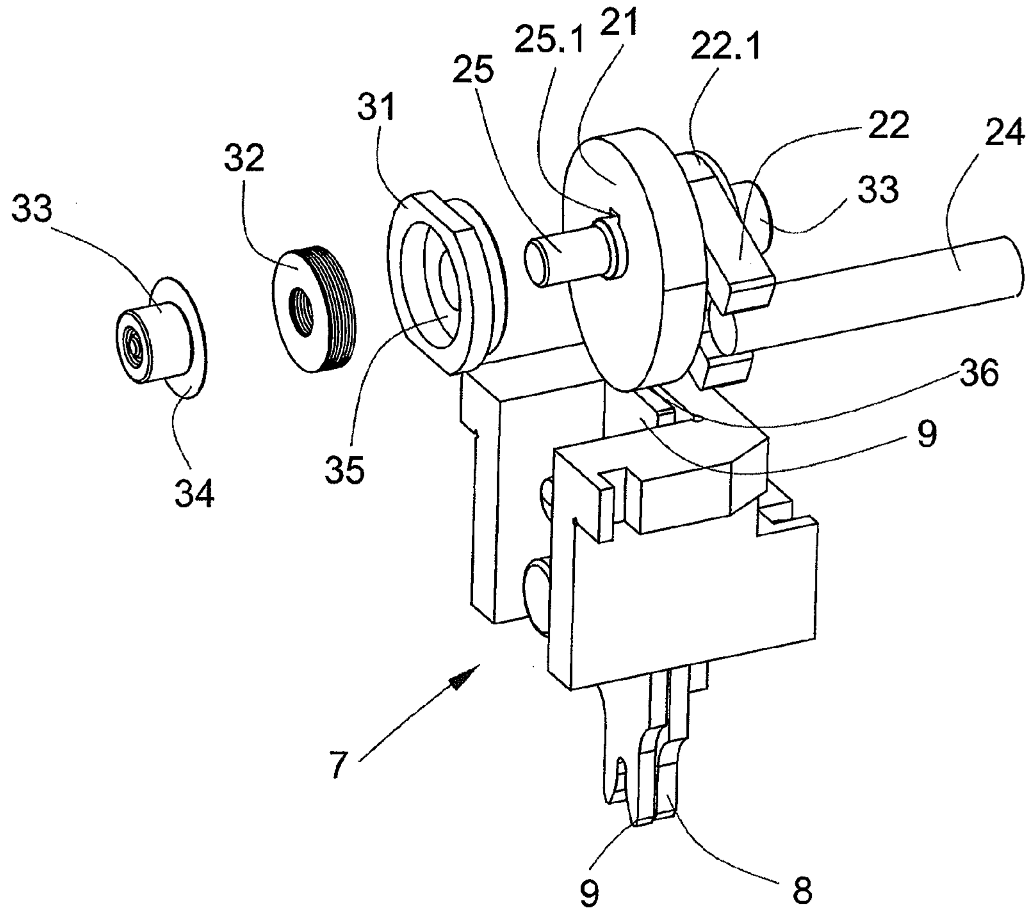
FIG. 4 is an exploded perspective view of the crimp-height adjuster with an eccentric disk shown in FIGS. 2 and 3.

FIG. 4 shows details of the crimp-height adjuster 20 by means of the eccentric disk 21. A socket 31 is non-rotatably set into the front wall 26 of the press slide 5. The socket 31 accommodates a disk-spring assembly 32. At both of its ends, the axle 25 is held in rolling-contact bearings 33. The disk-spring assembly 32 is pressed by a supporting surface 34 of the front bearing 33 onto the back wall 27 and a floor 35 of the socket 31 and by means of its spring force presses the axle 25 with the eccentric disk 21, the lever 22, and a compression disk 22.1 in the direction of the front plate 26. The friction caused by the spring force must be overcome for the eccentric disk 21 to turn. The eccentric disk 21, the lever 22, and the axle 25 are prevented from rotating relative to each other by means of a key 25.1.

Rotation takes place by means of a movement of the press slide 5 if the magnet 23, as shown in FIG. 4, has advanced the plunger 24 into the elongated hole 28. The press motor 3 is sufficiently powerful to overcome the friction of the disk-spring assembly 32. During production (upward/downward motion of the press slide 5 for the production of crimped fastenings) the eccentric disk 21 is prevented from rotating by means of the disk-spring assembly 32 and forms a fixed stop 36 for the insulation crimper 9 in the vertical direction. The stop 36 defines the crimp height for an insulation crimp 39 and thus how forcefully the insulation crimp 39 is pressed together (which depends on the thickness of the insulation of the wire).

Figures 5A, 5B:
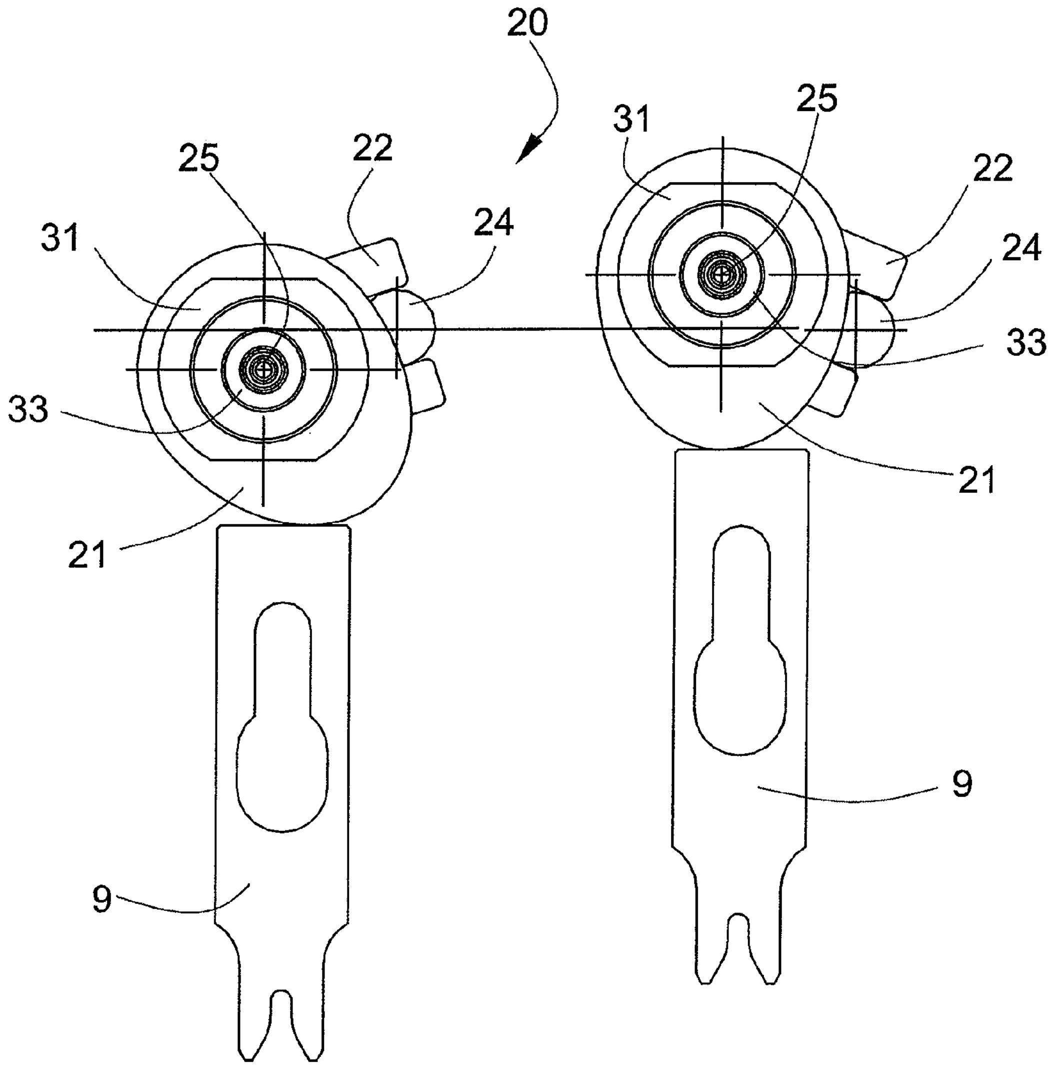
FIG. 5*a*, FIG. 5*b*, FIG. 5*c* are elevation views of the crimp-height adjuster shown in FIG. 4.
Figure 5C:
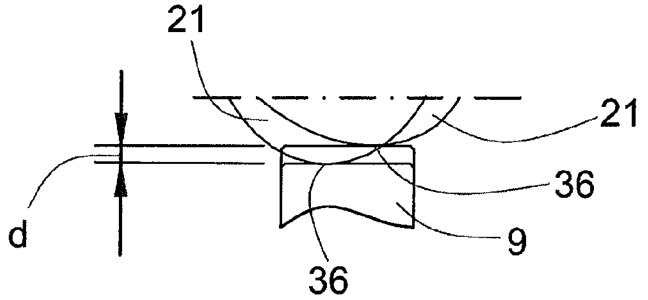

FIGS. 5*a*, 5*b*, and 5*c* show a representation of the crimp-height adjuster 20. With the plunger 24 inserted into the elongated hole 28 and with an upward motion of the press slide 5, after overcoming the friction of the disk-spring assembly 32, the eccentric disk 21 executes rotational motion in a clockwise direction. The lever 22 that is connected in a fixed manner to the axle 25 turns the eccentric disk 21 about the axle 25, the plunger 24 having play in the elongated hole 28. The change in vertical direction of the stop 36 and thus the adjustment of the crimp-height is indicated with d in FIG. 5*c*.

Figure 6:
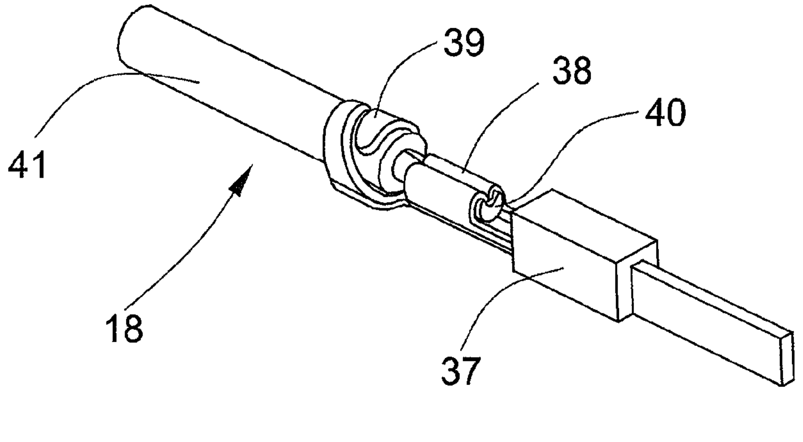
FIG. 6 is a perspective view of a crimped fastening produced by the crimping press according to the present invention.

FIG. 6 shows a crimped fastening between the wire 18 and the crimped contact 37 with a plastically deformed conductor crimp 38 and the plastically deformed insulation crimp 39. Plastic deformation of the crimps 38, 39 takes place by means of the crimpers 8, 9 and the anvil. The conductor crimp 38 embraces strands of a wire conductor 40 and the insulation crimp 39 embraces wire insulation 41 of the wire 18.

The crimp-height adjuster 20 according to the present invention can also be used for the conductor crimper 8 or for each of crimpers 8, 9.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A crimping press for fastening a crimped contact to a wire, the wire having a conductor and wire insulation and being fasteneable to the crimped contact by operation of crimpers arranged on a press slide, comprising:

a press motor coupled to the press slide, the press motor configured to drive the press slide; and a crimp-height adjuster actuatable for adjusting a crimp height of at least one crimper being provided on the press slide, said crimp-height adjuster being actuated by the press slide being moved by said press motor moving the press slide.

2. The crimping device according to claim 1 wherein said crimp-height adjuster has a rotatable eccentric disk that stops vertical movement of the at least one crimper.

3. The crimping device according to claim 2 wherein said eccentric disk is arranged on the press slide and is rotatable with the motion of the press slide, said press motor moving the press slide, and including means for preventing rotation of said eccentric disk.

4. The crimping device according to claim 3 including a lever rigidly connected to said eccentric disk for turning said eccentric disk with the motion of the press slide.

5. The crimping device according to claim 4 including a plunger actuated by an actuator for locking said lever, said eccentric disk being rotatable about an axis.

6. The crimping device according to claim 2 including wherein said means for preventing rotation includes a disk-spring assembly for frictionally hindering rotation of said eccentric disk.

7. A crimping press for fastening a crimped contact to a wire, the wire having a conductor and wire insulation, comprising:

at least one crimper arranged on a press slide for fastening the wire to the crimped contact;

a press motor coupled to said press slide, the press motor configured to drive the press slide; and a crimp-height adjuster selectively actuatable for adjusting a crimp height of said at least one crimper on said press slide, said crimp-height adjuster being automatically actuated by said press slide being moved by said press motor moving said press slide.

8. The crimping device according to claim 7 wherein said crimp-height adjuster has a rotatable eccentric disk that stops vertical movement of said at least one crimper.

9. The crimping device according to claim 8 wherein said eccentric disk is arranged on said press slide and is rotatable with a motion of said press slide, said press motor moving said press slide, and including means for preventing rotation of said eccentric disk.

10. The crimping device according to claim 9 including a lever rigidly connected to said eccentric disk for turning said eccentric disk with the motion of said press slide.

11. The crimping device according to claim 10 including a plunger actuated by an actuator for locking said lever, said eccentric disk being rotatable about an axis when locked by said lever.

12. The crimping device according to claim 8 including wherein said means for preventing rotation includes a disk-spring assembly for frictionally hindering rotation of said eccentric disk.

* * * * *